United States Patent [19]

McClure et al.

[11] Patent Number: 4,714,324
[45] Date of Patent: Dec. 22, 1987

[54] APPARATUS UTILIZING DISPERSION SHEAR

[75] Inventors: Richard J. McClure; Frederick J. Jeffers, both of San Diego, Calif.

[73] Assignee: Eastman Kodak Company, Rochester, N.Y.

[21] Appl. No.: 777,652

[22] Filed: Sep. 19, 1985

[51] Int. Cl.⁴ ............................................. G02B 26/02
[52] U.S. Cl. ..................................................... 350/362
[58] Field of Search .................... 350/267, 330, 350 S, 350/355, 362; 252/309

[56] References Cited

U.S. PATENT DOCUMENTS 3,328,110 6/1967 Berger et al. ........................ 350/362
3,512,876 5/1970 Marks ................................. 350/362
4,442,019 4/1984 Marks ................................. 350/267

Primary Examiner—William H. Punter
Attorney, Agent, or Firm—Robert F. Cody

[57] ABSTRACT

The disclosure hereof calls for the shearing of a thin film dispersion of magnetic particles. Magnetic fields, selectively perpendicular to the plane of shear or the direction of shear, control the degree of clumping experienced by the dispersion particles.

8 Claims, 5 Drawing Figures

APPARATUS UTILIZING DISPERSION SHEAR

BACKGROUND OF THE INVENTION

1. Field of the Invention

This invention relates in general to magnetic dispersion handling, and more particularly to apparatus that utilizes to advantage a phenomenon which has heretofore been unknown to the magnetic dispersion handling art.

2. Description Relative to the Prior Art

It is known to suspend a distribution of magnetic particles, e.g. gamma ferric oxide, in a binder comprised, at least in part, of one or more plastic resins and solvents therefor. This allows the particle distribution to be, for example, coated on a support for use in magnetic recording. When so employed, the dispersion, ideally, is made as uniform as possible to obviate media noise associated with the dispersion.

As will appear below, there are instances when it is desirable to effect . . . selectively . . . either a uniform dispersion, or controlled "clumping" of the dispersion particles: Whereas a uniform dispersion (if concentrated sufficiently) will essentially block the transmission of light therethrough, controlled clumping will permit light transmission in the "non-clump" regions of the dispersion. Selectivity as to the nature of a dispersion, therefore, finds use in such things as light valves.

SUMMARY OF THE INVENTION

By shearing a thin film dispersion of magnetic particles, it has been found that "roped" clumps of the particles occur to a fair extent. Light, attendantly, may pass through the film between the "ropes". By next applying a magnetic field perpendicular to the plane of shear, the particles which form the film align with the field and, since the dipoles associated with such particles are all similarly oriented, they mutually repel to cause the dispersion, then, to become almost perfectly uniform . . . and, of course, light blocking.

Given that a field is applied, during the aforesaid shearing, in the plane of the shear . . . but perpendicular to the direction of shear . . . the roped clumps which form become still better defined, and more enhanced.

The judicious application of a combination of shear and magnetic forces, as will be discussed below, is employed to effect one, or another, form of dispersion, as may be employed, for example, in connection with a light valve or with a coating operation.

The invention will be further described with reference to the figures, wherein

Figure 1:
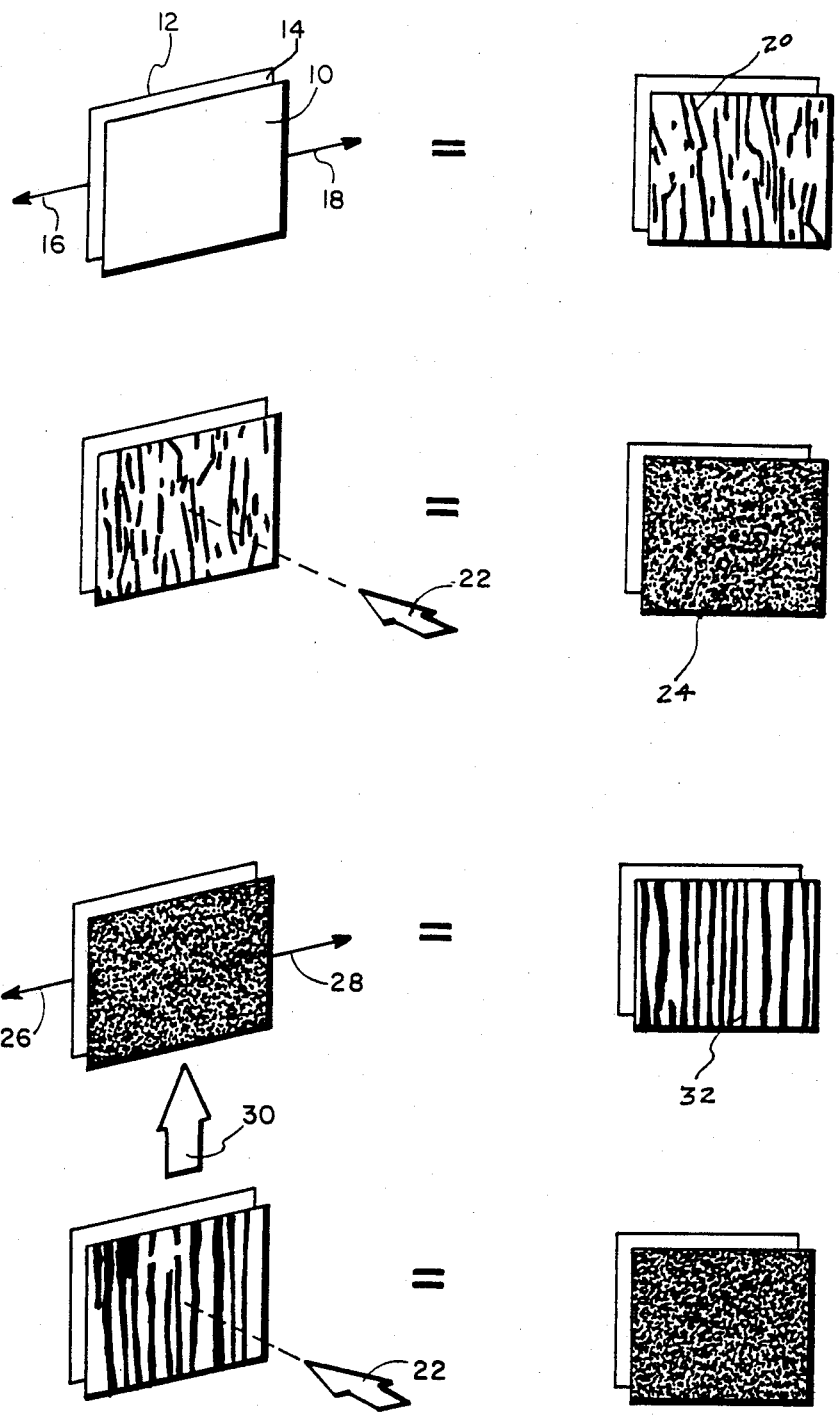
FIG. 1 is a schematic showing of various procedures illustrating the phenomenon associated with the invention.

Referring to FIG. 1, consider first and second microscope slides 10, 12 having a less-than-perfect dispersion 14 of magnetic oxide therebetween. The magnetic particles which form the dispersion are 0.2μ in length. The dispersion 14 is subjected to shear forces by moving the slides 10, 12 as indicated by the arrows 16, 18; and, attendantly, when the shearing stops, the oxide is clumped into discrete "ropes" 20 thereof. Given that a field 22 (15.5 koe) is applied perpendicular to what had been the plane of the shear, the dipoles associated with the magnetic particles all similarly orient and, as such, uniformly repel each other to create a nigh perfect dispersion 24.

If the dispersion 24 is now sheared (26, 28) in the presence of a field 30 (16000 oe) that is both parallel to the plane of shear and perpendicular to the direction of shear, the dispersion breaks up, only this time into a set of well-defined, augmented, and evenly distributed parallel ropes 32. Re-applying the field 22 perpendicular to the plane of shear has the effect of re-creating the nigh perfect distribution 24, thereby indicating the complete reversability of the aforesaid procedures.

For the invention to be employed in the environment of a light valve, either the "20-to-24" (and vice versa) implementation, or the "32-to-24" (and vice versa) implementation will suffice, although the "32-to-24" (and vice versa) implementation is preferred because of the greater predictability of the form of the roping. With this point in mind, then, reference should be had to the exploded view of FIG. 2, which shows a light valve structure having first and second main blocks 34, 36. Each main block has a respective light transmissive aperture 39, 40; and both blocks are coupled together (by suitable means) with a rubber gasket 42 therebetween. The gasket 42 has a window 44 that aligns with the apertures 38, 40 along an optical axis 46 of the structure; and, into the window 44, a dispersion of magnetic oxide is contained. As indicated, the main block 34 is mechanically grounded (50); and the main block 36 is selectively subjected to vibratory forces, thereby to shear the dispersion contained within the window 44 of the gasket 42. A yoke 52 of magnetic material, adapted to support an excitation coil (not shown) at a narrowed neck 53 thereof, slides into a rest position on the shoulders 54 of the main blocks 34, 36. By exciting the coil which is supported on the yoke 52, while vibrating the main block 36, augmented ropes form in the dispersion contained within the gasket window 44. A second yoke 56 of magnetic material straddles, and clips to, the main block assemblage, the yoke 56 having first and second light transmissive windows 58, 60. The yoke 56 is narrowed at its center 62 to allow support for an excitation coil (not shown), and to permit the flexure of the yoke 56 when the main block 36 is vibrated.

Figure 2:
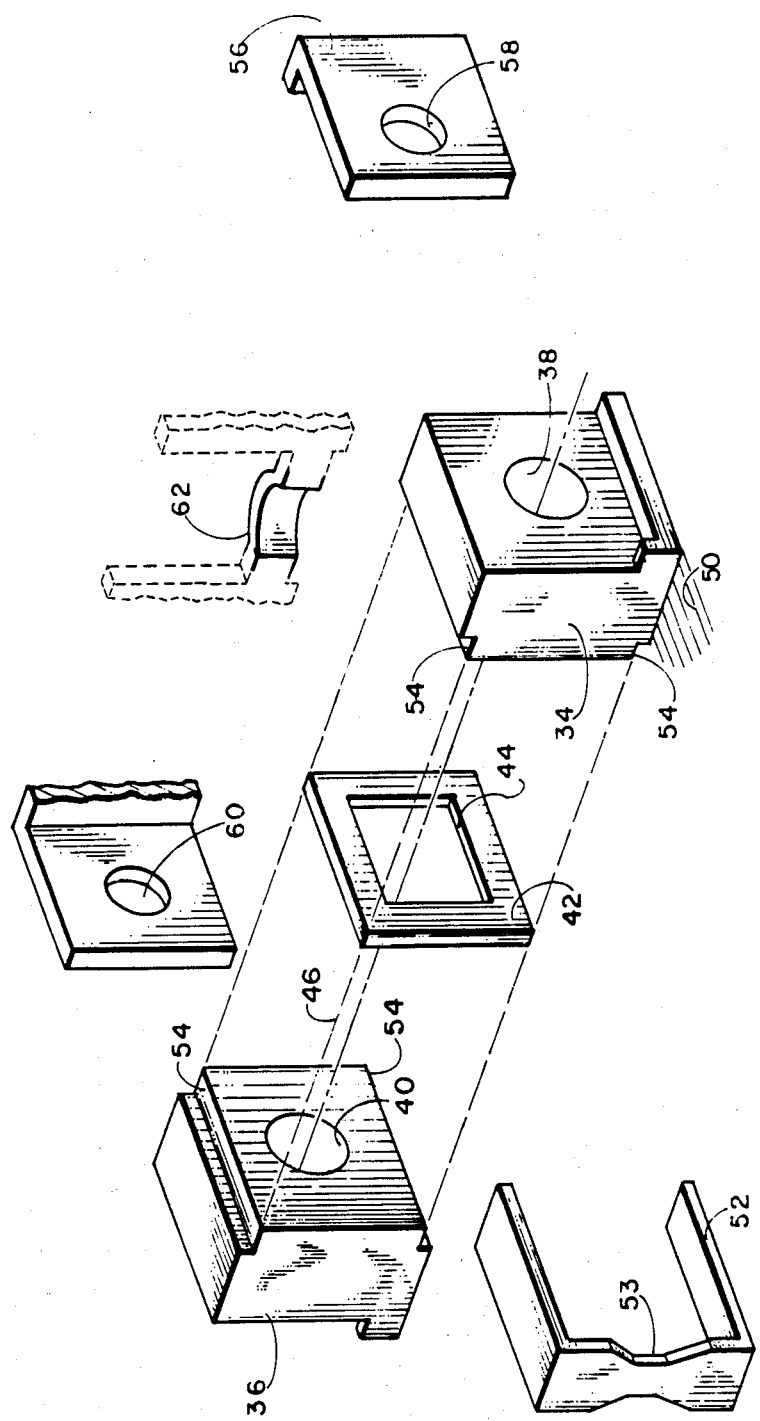
FIG. 2 is an exploded view of a light valve employing the teaching of the invention.
Figure 3:
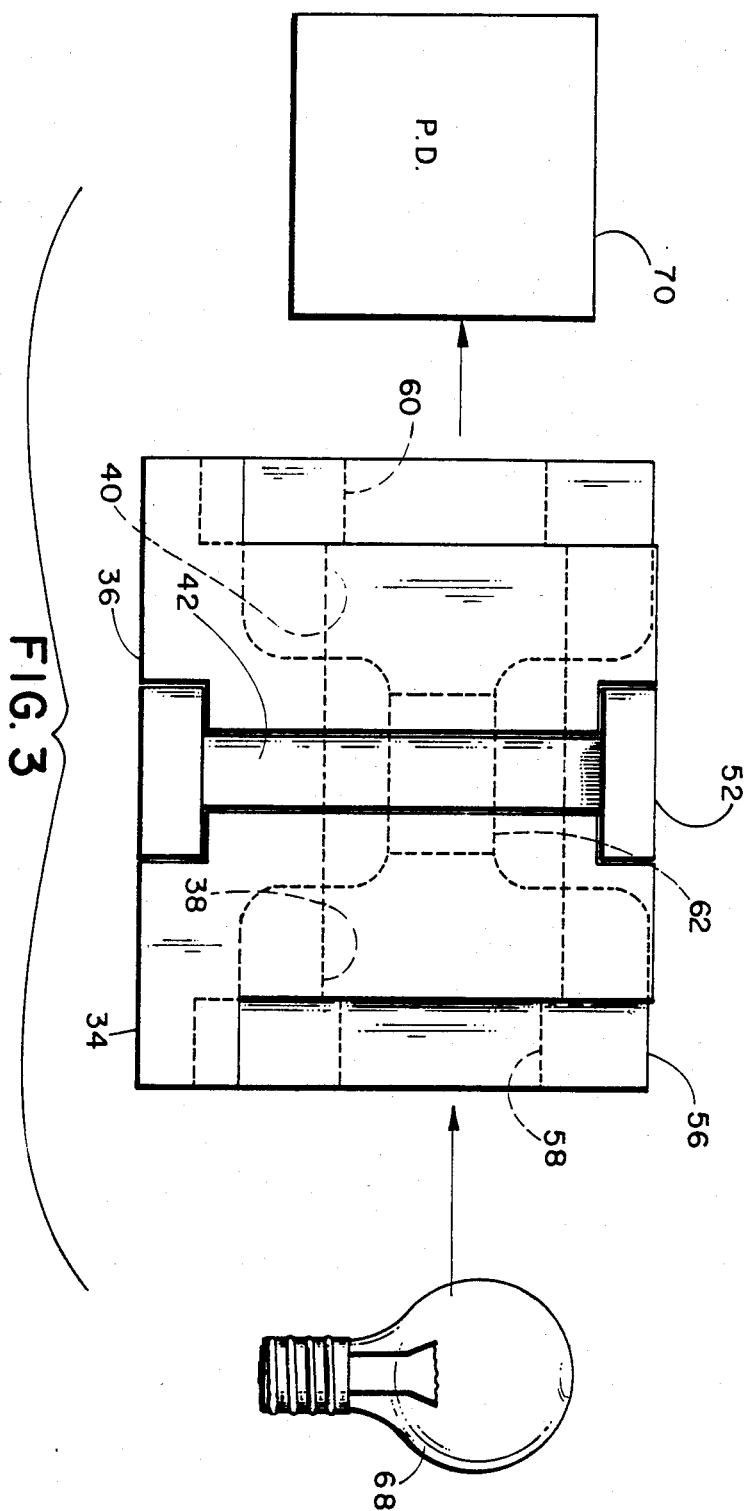
FIG. 3 is a side elevational view of the structure of FIG. 2.

With the structure of FIG. 2 disposed in a light valve system as depicted in FIG. 3, operation is as follows . . .

Light Valve OPEN: Vibrate the main block 36 to shear the dispersion within the gasket window 44, while simultaneously applying, in the plane of shear, a magnetic field by means of the yoke 52. Light from a lamp 68 may, therefore, reach a photodetector 70 via 'between-rope' passage through the dispersion.

Light Valve CLOSED: Apply a magnetic field perpendicular to the plane of shear, i.e. perpendicular to the plane of the dispersion within the gasket window 44, by exciting the coil associated with the yoke 56, thereby uniformly distributing the dispersion particles into a light blocking condition.

Figure 4:
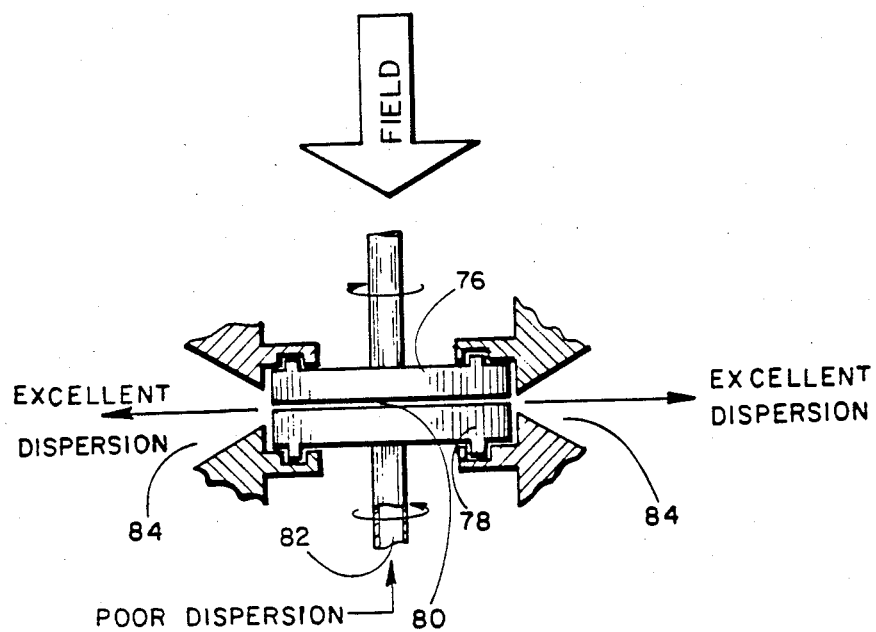
FIG. 4 is a schematic diagram of a dispersion handling system according to the invention.
Figure 5:
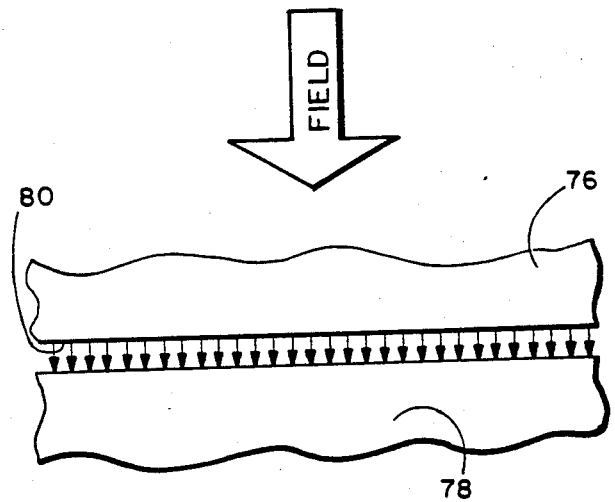
FIG. 5 is an illustration of the working of the invention as employed in the dispersion handling system of FIG. 4.

As indicated above, application of the invention has varied uses, and may for example be used in connection with a procedure for effecting a nigh perfect dispersion prior to a media coating operation. Referring, therefore, to FIG. 4, first and second counter-rotating discs 76, 78 provide a narrowed, planar passage way 80 for passage therethrough of a magnetic dispersion. Assuming a "poor dispersion" is applied to the passage way 80 via an inlet port 82, a nigh "perfect dispersion" will traverse the passage way 80 and then exit outlet ports 84. Counter-rotating the discs 76, 78 has the effect of shearing the dispersion and, by applying a magnetic field perpendicular to the plane of shear during such shearing, the particle dipoles uniformly orient and . . . desirably . . . uniformly disperse as indicated in FIG. 5. Coating may then be implemented as taught in the art.

The invention has been described in detail with particular reference to a presently preferred embodiment, but it will be understood that variations and modifications can be effected within the spirit and scope of the invention.

What is claimed is:

1. Apparatus for use with a dispersion of magnetic particles, said apparatus comprising
   a. first and second spaced apart means for receiving said dispersion of magnetic particles therebetween,
   b. drive means for relatively moving said first and second means to impart shearing forces to said dispersion of said magnetic particles, and
   c. means for applying a magnetic field perpendicular to the plane of shear experienced by said dispersion, the strength of said field being sufficient to orient similarly the dipoles associated with said particles and thereby cause said particles to repel mutually each other to effect a nigh perfect dispersion thereof.

2. The apparatus of claim 1 further comprising means for applying a field that is both in the plane of shear experienced by said dispersion and perpendicular to the direction of said shear.

3. The apparatus of claim 1 wherein said drive means so couples to said dispersion that, in response to operation of said drive means, the particles which comprise said dispersion clump together in the form of ropes.

4. The apparatus of claim 3 wherein said dispersion is such that, in response to said field perpendicular to the plane of shear experienced by said dispersion, said dispersion becomes substantially opaque.

5. The apparatus of claim 4 wherein said first and second spaced apart means are light transmissive.

6. The apparatus of claim 2 wherein said drive means so couples to said dispersion that, in response to operation of said drive means, the particles which comprise said dispersion clump together in the form of ropes.

7. The apparatus of claim 6 wherein said dispersion is such that, in response to said field perpendicular to the plane of shear experienced by said dispersion, said dispersion becomes substantially opaque.

8. The apparatus of claim 7 wherein said first and second spaced apart means are light transmissive.

* * * * *